Feb. 28, 1928.  1,660,686

A. H. STEBBINS

AIR CLASSIFIER

Filed Feb. 1, 1927  2 Sheets-Sheet 1

INVENTOR:
Albert H. Stebbins
BY Robt. P. Haines
ATTORNEY

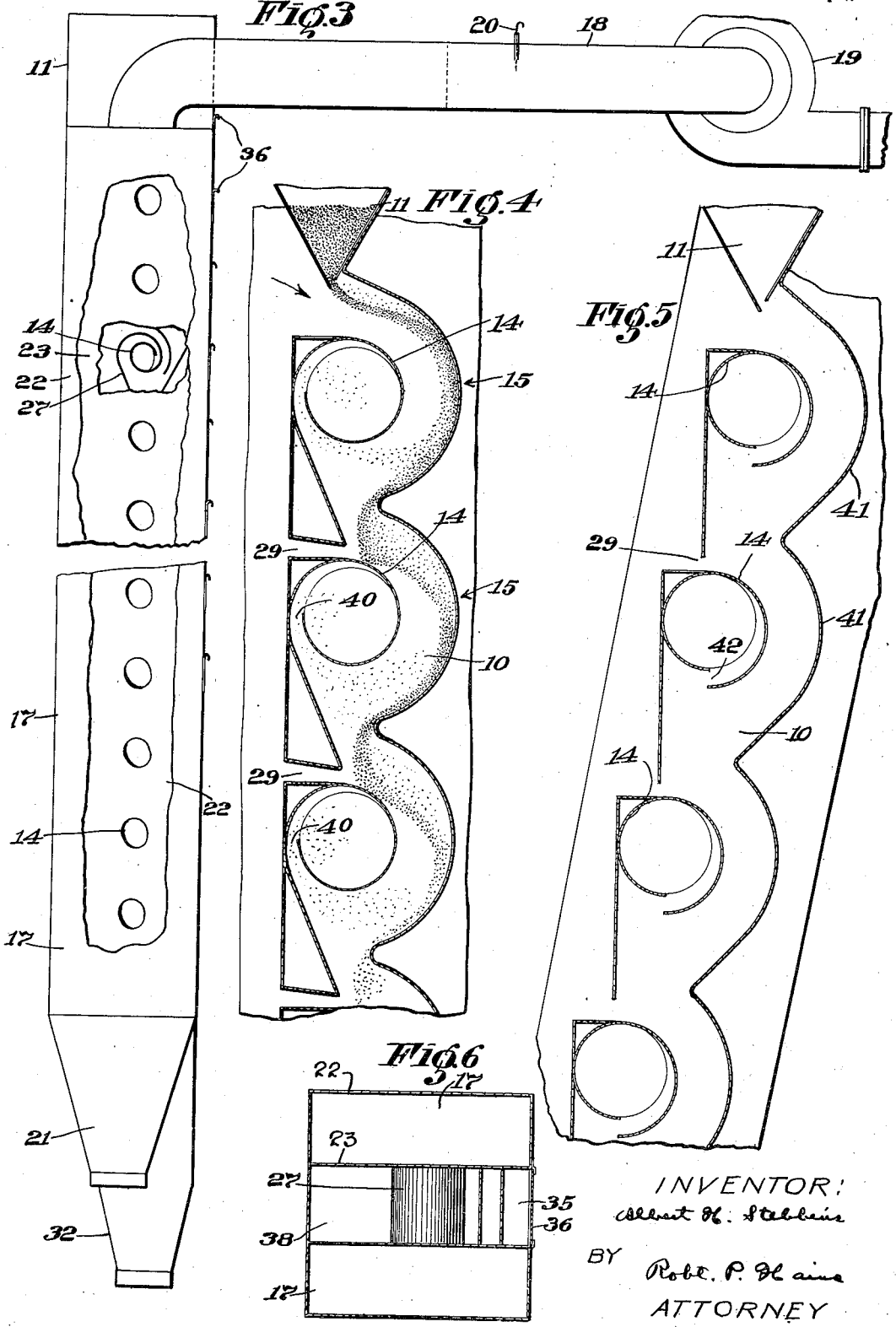

Patented Feb. 28, 1928.

1,660,686

UNITED STATES PATENT OFFICE.

ALBERT H. STEBBINS, OF LOS ANGELES, CALIFORNIA.

AIR CLASSIFIER.

Application filed February 1, 1927. Serial No. 165,070.

This invention relates to multiple treatment air classifiers adapted for use in separating fine dust-like materials.

These fine dust-like particles are hard to separate because they tend to cling together and will not settle rapidly out of the air in which they are carried. It is therefore desirable to employ centrifugal force either alone, or in combination with gravity, to promote the separation of the very fine particles from the slightly larger particles, and in order to effect a complete classification the materials should be subjected repeatedly to the separating forces.

The present invention is therefore directed to an air classifier which is so constructed that as air bearing the materials to be treated travels along a predetermined path the finer particles are gradually withdrawn from this path while the larger particles are thrown outwardly away from the withdrawing means by centrifugal force.

In accordance with the present invention the air carrying the fine materials to be separated is caused to travel at high speed within a tortuous conduit so that the heavier particles within the air are thrown outwardly by centrifugal force toward the outer wall of the loops or bends of the conduit. In this manner the air traveling near the inner curves of the loops of the conduit is freed from the larger particles so that by withdrawing the air at the inner walls of the loops the finer particles are removed from the conduit while the larger particles remain therein throughout the classifying operation.

One of the features of the invention resides in the construction whereby the tortuous conduit is formed of a series of rounded loops or bends connected by more sharply bent loops or bends whereby the change in the configuration or bends of the tortuous conduit will effect a shifting of the position of the particles within the air traveling lengthwise of the conduit to thereby break up or separate the groups of particles that may tend to cling together.

If air is extracted from the conduit at a number of points along its length the volume of the air therein will be gradually decreased unless the removed air is replaced by additional air. Another feature of the invention therefore resides in the construction whereby air is introduced into the conduit at a number of points along its length and at opposite sides of the air passage to replace the air that is extracted from the conduit. By introducing air into the conduit from its opposite sides air currents will be produced that cross the path of the materials to pick out the finer particles.

Other features of the invention and novel combination of parts in addition to the above will be hereinafter described in connection with the accompanying drawings which illustrate good practical forms of the invention.

In the drawings,—

Figures 1, 2:
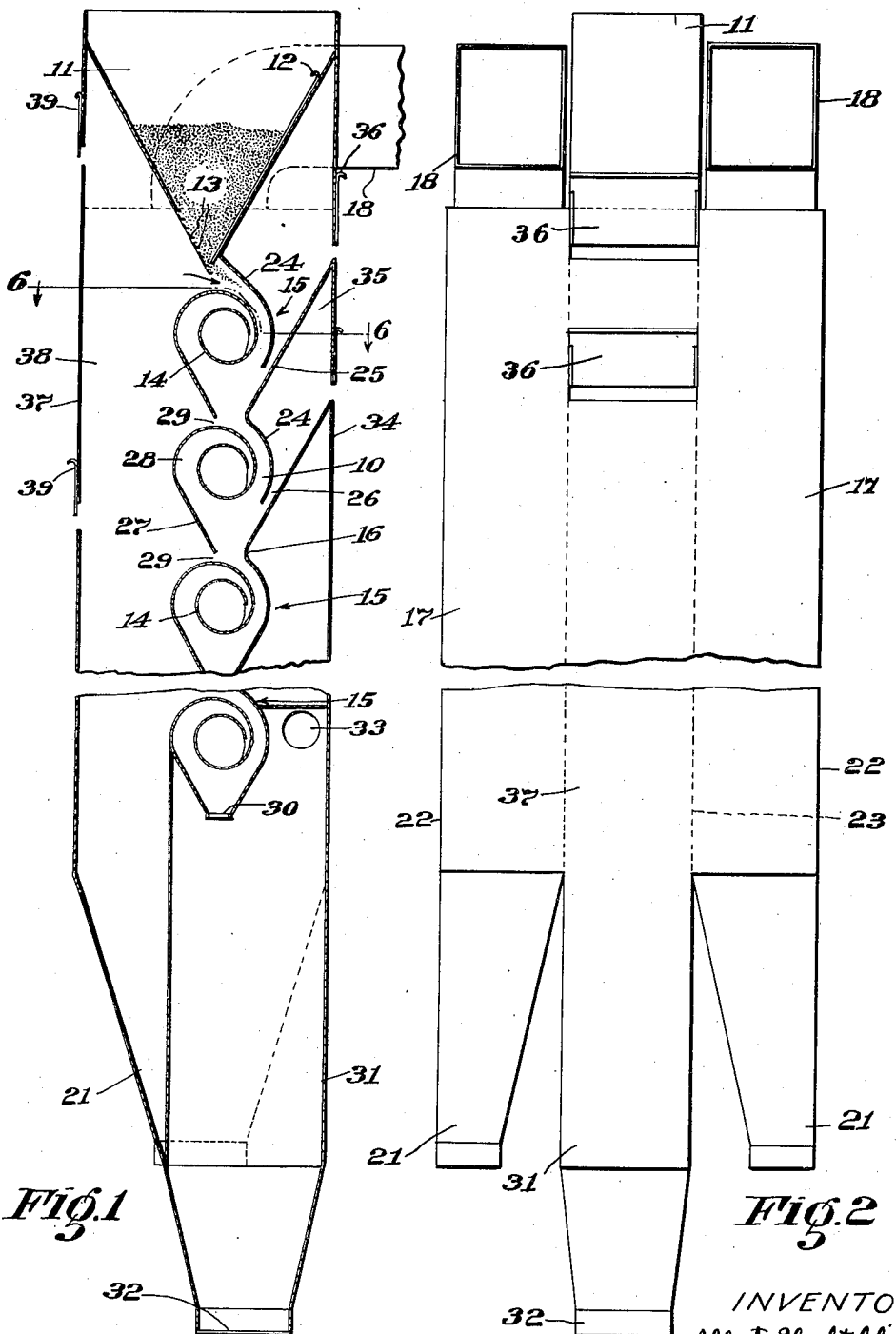
Fig. 1 is a vertical sectional view through a classifier constructed in accordance with the present invention.
Fig. 2 is a front elevation of the classifier of Fig. 1.

Fig. 3 on a somewhat reduced scale is a side view of the classifier of Fig. 1, with parts of the walls broken away;

Fig. 4 is a vertical sectional view through a modified type of classifier;

Fig. 5 is a similar view showing a second modified construction, and

Fig. 6 is a sectional view taken on the line 6—6 of Fig. 1.

The present invention may be given various embodiments and one good construction is shown in Figs. 1, 2 and 3, wherein the materials to be treated are delivered to the upper end of the conduit 10 by the hopper 11 which hopper is provided with the sliding gate 12 for controlling the rate at which the materials are delivered to the conduit by the hopper.

The classifier of the present invention is supported in an upright position and may be operated either by suction, or by an air blast, or by the combination of suction and air blast. In many cases the use of suction alone will be desirable because if the materials being treated are carried lengthwise of the conduit 10 by suction they will exert a less wearing and cutting action upon the walls of the receptacle 10 than they will if they are carried through this conduit by an air blast.

In the construction shown the entire operation of the classifier is effected by exhausting air from the conduit 10 at various points along its length. This serves to draw the air into the conduit at its upper end where the materials are introduced into the path of this air by the discharge hopper, and to prevent the materials within the hopper from becoming clogged at the lower end thereof it may be desirable to form apertures 13 within the hopper wall near its lower end so that part of the air entering the upper end of the conduit 10 may pass through these apertures to promote the flow of the materials into the mouth of the conduit.

The means shown for exhausting air from the conduit 10 at various points along its length consists of the transversely extending pipes 14 which are positioned within the loops or bends of the tortuous conduit, as will be apparent from the drawings. The conduit 10 in the construction shown lies in its entirety at one side of the series of pipes 14 and each loop of the conduit partly embraces an exhaust pipe 14. As will be apparent from the drawings, the successive loops or bends 15 of the conduit are connected by the portion 16 having a sharp bend, the arrangement being such that the path of the materials traveling within the conduit 10 bends more or less abruptly as it passes from one loop 15 to the next. This pronounced bend in the path of the materials serves to break up the lumps or groups of particles that may tend to cling together.

In the construction shown air is exhausted from the transversely extending pipes 14 by connecting the opposite ends of these pipes with the air exhaust chambers 17 disposed at the opposite sides of the conduit 10, and air is removed from the upper end of the chambers 17 by the exhaust pipes 18 which may lead to the exhaust fan 19. The amount of air exhausted from each of the chambers 17 may be regulated as desired by adjusting the gate or valves 20 provided in the pipe 18. The air exhaust chambers 17 are preferably made relatively large as shown, so that the larger particles that enter these receptacles may settle therein to collect in the lower ends 21 from which they may be withdrawn from time to time, as found desirable.

The entire classifier of the present invention may be constructed of sheet metal and the receptacles 17 are provided with the outer walls 22 and the inner walls 23. The conduit 10 may be formed by providing the curved outer walls 24 the side edges of which may be secured to the vertical walls 23. Each curved wall 24 may have an upwardly inclined portion 25 which lies in spaced relation to the lower end of the wall 24 immediately above it, the construction being such that an air inlet passage 26 is provided between the adjacent walls 24 and 25, as will be apparent from Fig. 1 of the drawing. The opposite wall of the conduit 10 is formed, in the construction shown, by providing the wall sections 27 the marginal side edges of which may be secured to the spaced vertical walls 23, and each wall section 27 may have the spiral construction shown, which serves to form the transversely extending pipe 14 and also the spiral passage 28 through which air passes from the conduit 10 to the exhaust pipe. The lower end of each wall section 27 may be spaced a short distance from the curved wall immediately below it to provide the air inlet opening 29.

It will be seen from the construction just described that air is exhausted from the inner curved portion of each loop 15 of the conduit by the transversely extending suction pipe 14. This draws air into the conduit 10 at its upper end so that this air and the materials delivered by the hopper 11 travel lengthwise of the conduit at high speed, with the result that the heavier particles within the air are thrown outwardly by centrifugal force towards the outer curved walls 24 of the conduit. The air traveling adjacent the inner wall of the loops or bends of the conduit 10 is practically free from the larger particles and the exhaust means above described will serve to remove this air and the lighter particles traveling near the inner curved wall of the conduit, while the larger particles will remain within the conduit throughout the separating operation. Upon reaching the lower end 30 of the conduit the larger particles are discharged into the closed receptacle 31 from which the materials may be withdrawn from time to time through the opening 32 at the lower end of this receptacle. The air which passes into the receptacle 31 with the larger particles may be removed therefrom by providing openings 33 at the upper end of the receptacle 31 which openings communicate with the exhaust chambers 17.

It will be understood from the foregoing description and drawings that air is withdrawn from the conduit 10 at a multiplicity of points throughout its length, and in order to prevent the volume of air within the conduit from being unduly reduced air is introduced into the conduit at a multiplicity of points throughout its length through the air inlet openings 29, and air is also introduced into the conduit through the air inlet openings 26 disposed at the opposite side of the conduit from the openings 29. By arranging the inlet openings 26 at the opposite side of the conduit from the suction pipes 14, air currents are caused to move across the path of the materials traveling within the conduit, and this will facilitate the separation of the finer from the coarser particles.

It may be desirable to control the volume of air which is permitted to enter the conduit 10 through the openings 26 and to this end in the construction shown a partition or side wall 34 is provided between the spaced air exhaust receptacle 17 so that the air chambers 35 are formed between the walls 24 and 34 and the entrance of air into these chambers 35 is controlled by adjustment of the sliding gates 36. The opposite side of the classifier may be provided with a partition or wall 37 similar to the wall 34 to form the air chamber 38 between said wall and the conduit 10, and the amount of air that is permitted to enter the chamber 38 may be controlled by adjusting the sliding gates 39.

The separating units or loops 15 of the conduit 10 may be made small so that the distance between successive loops or between adjacent exhaust pipes 14 need not be more than two inches, with the result that six successive treatments may be effected within a vertical foot of the classifier. As a result of this small compact construction of the classifier, 100 or more treatments may be effected in a classifier the height of which is not excessive, and by subjecting the materials passing through the conduit to this large number of successive treatments the fine particles may be completely removed from the slightly larger particles.

The modification shown in Fig. 4 is substantially the same in construction and operation as the classifier shown in Figs. 1, 2 and 3 except that in Fig. 4 the air inlet opening 40 leading into the air exhaust pipe 14 is displaced nearer the central channel of the conduit 10 than in Figs. 1, 2 and 3 and as a result the materials carried by the air towards the passage 40 will have less opportunity to settle, in the construction shown in Fig. 4, than they will in the construction of Fig. 1. Furthermore, the air inlet openings 26 of Fig. 1 have been omitted from the construction shown in Fig. 4.

The modified construction of Fig. 5 differs from that of Fig. 4 in that the entire classifier is supported at an inclination to the vertical and is given the stepped construction shown. This is desirable in some constructions because by imparting this stepped construction to the curved outer wall 41 of the classifier of Fig. 5 the heavier particles carried by the air will pass more readily from one looped portion of the conduit to the next, as will be apparent from the drawing. In the modified construction of Fig. 5 it should be noted that the inlet passage 42 leading into the exhaust pipe 14 is disposed at the lower side of the exhaust pipe. This construction will enable the air to pass more readily from the conduit 10 to the exhaust pipe, but on the other hand will increase the tendency of the larger particles to escape through the exhaust pipes 14.

A classifier constructed in accordance with the present invention, while small and compact, has a large capacity due to the continuous passage of the air and materials to be treated through the tortuous conduit at high speed, and it utilized the separating action of centrifugal force to a high degree considering the small size of the loops of the conduit. The operation of this novel classifier requires very little attention on the part of the operator, and the large number of treatments to which the materials are subjected serves to completely remove the finer from the slightly larger particles, while the high speed at which the materials travel within the conduit prevents clogging.

What is claimed is:—

1. A multiple treatment classifier, comprising in combination, a tortuous conduit having a series of rounded loops or bends connected by more sharply bent loops or bends adapted to impart an abrupt turn to the air as it passes from one to another of the first mentioned loops or bends, means for introducing air and the materials to be treated into the conduit to travel within its passage at high speed so that the heavier particles will be thrown outwardly by centrifugal force toward the outer wall of the loops, and means for removing from the conduit at the inner side of the loops the air which has been freed from the heavier particles by centrifugal force.

2. A multiple treatment classifier, comprising in combination, a tortuous conduit having a series of rounded loops or bends connected by sharply bent portions of the conduit that are formed to present a wall lying at substantially right angles to the path of travel within the conduit to thereby impart an abrupt turn to the air as it passes from one to another of the loops or bends, means for introducing air and the materials to be treated into the conduit to travel therein at high speed so that the heavier particles will be thrown outwardly by centrifugal force toward the outer wall of the loops, and means for removing from the conduit at the inner side of the loops the air which has been freed from the heavier particles by centrifugal force.

3. A multiple treatment classifier, comprising in combination, a supporting structure, a series of exhaust pipes supported in spaced relation to each other and so that they extend transversely of the supporting structure, a tortuous conduit disposed in its entirety at one side of the series of pipes and formed with looped portions, all of which curve in the same direction about the pipe to partially embrace them and communicate therewith, means for introducing air and the materials to be treated into the conduit to travel therein at high speed so that the heavier particles will be thrown outwardly by centrifugal force toward the outer wall of the loops, and means for exhausting air from said pipes to remove from the conduit at the inner side of the loops the air which has been freed from the heavier particles by centrifugal force.

4. A multiple treatment classifier, comprising in combination, a tortuous conduit constructed to be supported at an inclination to the vertical and provided with a series of rounded looped portions all of which are curved in the same direction and are disposed one below the other in a stepped relation to facilitate the passage of the materials from one looped portion into the next, means for introducing air and the materials to be treated into the conduit to travel therein at high speed so that the heavier particles will be thrown toward the outer wall of the loops by centrifugal force, and means for removing from the conduit at the inner side of the loops the air which has been freed from the heavier particles by centrifugal force.

5. A multiple treatment classifier, comprising in combination, a supporting structure, a series of exhaust pipes supported in a row so that they extend transversely of the supporting structure, a tortuous conduit disposed in its entirety at one side of the series of pipes and formed with looped portions all of which curve in the same direction about the pipes to partially embrace them and communicate therewith, means for introducing air and the materials to be treated into the conduit to travel therein at high speed so that the heavier particles will be thrown outwardly by centrifugal force towards the outer wall of the loops while the lighter particles will escape through said pipes, and means for introducing additional air into the conduit at successive points along the same.

6. A multiple treatment classifier, comprising in combination, a supporting structure, a series of exhaust pipes supported in a row so that they extend transversely of the supporting structure, a tortuous conduit disposed in its entirety at one side of the series of pipes and formed with looped portions all of which curve in the same direction about the pipes to partially embrace them and communicate therewith, means for introducing air and the materials to be treated into the conduit to travel therein at high speed so that the heavier particles will be thrown outwardly by centrifugal force towards the outer wall of the loops while the lighter particles will escape through said pipes, means for introducing additional air into the conduit at successive points along the same, and adjustable means for controlling the flow of the additional air into the conduit.

7. A multiple treatment classifier, comprising in combination, a supporting structure, a series of exhaust pipes supported in a row so that they extend transversely of the supporting structure, a tortuous conduit formed of looped portions that embrace and communicate with said pipes and said looped portions being connected between the pipes by sharply bent portions, means for introducing air and the materials to be treated into the conduit to travel therein at high speed so that the heavier particles will be thrown outwardly against the outer wall of the loops while the lighter particles escape through said pipes, and means for introducing additional air into the conduits at points lying between said pipes.

In testimony whereof, I have signed my name to this specification.

ALBERT H. STEBBINS.